Patented Aug. 14, 1928.

1,681,103

UNITED STATES PATENT OFFICE.

CLAUDE DIAMOND, OF COVENTRY, ENGLAND, ASSIGNOR TO COURTAULDS LIMITED, OF LONDON, ENGLAND.

ESTERIFICATION OF CELLULOSE IN PRESENCE OF A PHENOL.

No Drawing. Application filed April 14, 1927, Serial No. 183,902, and in Great Britain June 21, 1926.

It is well known that cellulose, including both cotton cellulose and wood cellulose, which has been subjected to treatment with caustic soda, is not satisfactorily converted into cellulose esters by direct treatment with esterifying agents. For instance if wood pulp, purified by treatment with caustic soda solution, be subsequently treated with acetic acid, acetic anhydride and a small proportion of sulphuric acid, it will either not acetylate or else it gives rise to a cellulose acetate which by reason of the insufficient clarity and homogeneity of its solution in acetone, is unsuitable for the production of artificial silk and the like.

I have now found that both cotton cellulose and also wood-pulp which have been purified by treatment with caustic soda can be rendered more adaptable to esterification by a preliminary treatment with a relatively small proportion of a phenolic body, such for instance as phenol, meta-cresol, or a mixture of cresols.

The conditions under which the cellulose is treated with the phenolic body may vary considerably. For instance, when treating with a given percentage of meta-cresol wood pulp which has previously been purified by means of an 18 per cent caustic soda solution, a shorter period of time is required for such treatment at a temperature of say 50° to 60° centigrade than is necessary at ordinary temperature.

With phenol, however, the treatment will generally proceed satisfactorily at ordinary temperature if the mixture be continuously stirred or mixed in a rotating barrel.

The following examples will further illustrate how the invention may be carried out in practice, but the invention is not restricted to these examples.

*Example 1.*—To 100 parts of comminuted wood-pulp, which has been previously purified with an 18 per cent caustic soda solution and which contains 8 per cent of moisture, 15 parts of meta-cresol are added and the mixture is stirred repeatedly for from 6 to 8 hours while maintaining a temperature of 50° centigrade.

*Example 2.*—To 100 parts of comminuted wood-pulp, which has been previously purified with an 18 per cent caustic soda solution, and which contains 9 per cent of moisture, 17 parts of phenol are added and the mixture is stirred repeatedly for about 9 hours, while maintaining a temperature of 20° to 25° centigrade.

The conditions given in these examples may be varied considerably; for instance, if the mixing be omitted, the time required to attain the desired result may be 18 hours or even longer.

If desired, the excess of the phenolic body may be removed from the cellulose after the treatment and before the acetylation is commenced.

The cellulose treated in accordance with the aforesaid examples may be acetylated in any suitable manner, such for instance as described in the specification of British Letters Patent No. 21,628 of 1901.

What I claim is:—

1. A process of preparing for acetylation, cellulose which has been treated with caustic soda, the said process consisting in treating the said cellulose with a phenol, substantially as described.

2. A process of producing cellulose acetate which consists in first treating the cellulose which has been treated with caustic soda with a phenol and then with an acetylating agent.

In testimony whereof I have signed my name to this specification.

CLAUDE DIAMOND.